United States Patent [19]

Teige et al.

[11] 4,093,585
[45] June 6, 1978

[54] PROCESS FOR THE DYEING OF WATER-INSOLUBLE THERMOPLASTIC POLYMERS AND POLYCONDENSATES IN THE MASS

[75] Inventors: Wolfgang Teige, Kelkheim, Tannus; Rudolf Schickfluss, Frankfurt am Main, both of Germany

[73] Assignee: Hoechst Aktiengesellschaft, Frankfurt am Main, Germany

[21] Appl. No.: 772,576

[22] Filed: Feb. 28, 1977

[30] Foreign Application Priority Data

Mar. 2, 1976 Germany .............................. 2608481

[51] Int. Cl.² .............................................. C08K 5/35
[52] U.S. Cl. ............................... 260/40 P; 260/42.21; 260/37 NP
[58] Field of Search ............. 260/307 C, 240 F, 40 P, 260/37 NP, 42.21

[56] References Cited

U.S. PATENT DOCUMENTS

| 2,571,319 | 10/1951 | Waters et al. ................. 260/40 P X |
| 3,489,713 | 1/1970 | Bowman et al. ................ 260/40 P X |
| 3,617,170 | 11/1971 | Hansen et al. ................ 260/240 F X |
| 3,793,341 | 2/1974 | Genta ............................. 260/40 P X |

OTHER PUBLICATIONS

*Modern Plastics Encyclopedia* 1967, Sep., 1966, vol. 44, No. 7A, p. 459.

*Primary Examiner*—Sandra M. Person
*Attorney, Agent, or Firm*—Curtis, Morris & Safford

[57] ABSTRACT

Process for the dyeing of a water-insoluble thermoplastic polymer or polycondensate in mass, which comprises adding to the said thermoplastic material before the final molding thereof an azlactone dyestuff of the formula (1)

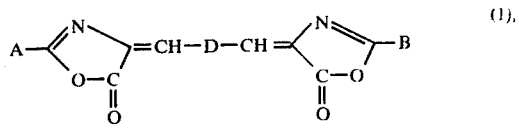

in which A and B each represents naphthyl, phenyl, chlorophenyl, bromophenyl, lower alkyl-phenyl, lower alkoxyphenyl, nitrophenyl,

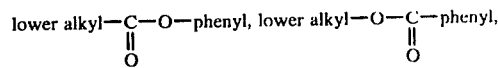

cyanophenyl, dichlorophenyl, chloro-lower alkyl-phenyl, nitro-lower alkyl-phenyl, chloro-nitrophenyl, A and B being identical or different, D represents naphthylene, phenylene, monochlorophenylene, dichlorophenylene or di-lower alkoxyphenylene, or with a mixture of dyestuffs of the said formula (1), the dyeings so obtained representing brilliant yellow dyeings of high tinctorial strength being distinguished by very good fastness to light, rubbing and ironing and, particularly, an outstanding stability toward heat.

6 Claims, No Drawings

PROCESS FOR THE DYEING OF WATER-INSOLUBLE THERMOPLASTIC POLYMERS AND POLYCONDENSATES IN THE MASS

The present invention relates to a process for the dyeing of water-insoluble thermoplastic polymers and polycondensates in the mass.

The subject of the present invention is a process for the dyeing of water-insoluble thermoplastic polymers and polycondensates in the mass, which comprises dyeing the above-mentioned thermoplastic materials, prior to their final shaping, with an azlacetone dyestuff of the general formula (1)

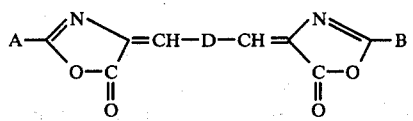 (1), in which A and B represent identical or different naphthyl radicals and/or phenyl radicals which may be substituted by halogen atoms, preferably chlorine or bromine atoms, $alkyl_{C_1-C_4}$, $alkoxy_{C_1-C_4}$, nitro, cyano,

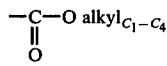

and/or acyloxy groups, for example $alkyl_{C_1-C_4}$ CO—O— groups or the benzoyloxy or toluyloxy groups, D stands for a naphthylene or phenylene radical which may be substituted by halogen atoms, preferably chlorine or bromine atoms, $alkyl_{C_1-C_4}$ and/or $alkoxy_{C_1-C_4}$ groups, or with a mixture of dyestuffs of the above-mentioned formula (1) in the mass.

Of the water-insoluble thermoplastic polymers and/or polycondensates which may be dyes according to the process of the invention, there may be mentioned polystyrene, polyamide, polymethacrylate, unplasticized polyvinyl chloride and especially linear polyesters, such as polyethylene-glycolterephthalate.

The dyestuffs of the general formula (1) which are used according to the invention may be obtained, in accordance with the process described by P. Ruggli and O. Schetty (Helv. Chim. Acta 23, 718 (1940) and in German Offenlegungsschrift No. 2 031 133, by condensing bisaldehydes of the general formula (2)

 (2)

with hippuric acids (aroylglycines) of the general formulae

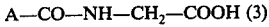 (3)

and

B—CO—NH—CH$_2$—COOH (3a)

while water is being split off.

In formulae 2, 3 and 3a, A, B and D are defined as above, the meanings of A and B being identical as a rule, but they may also be different.

The azlacetone dyestuffs described herein are especially suitable for the dyeing in the mass, in particular the spun dyeing, since then show an excellent heat resistance up to temperatures of 300° C, which was surprising and could not have been foreseen.

In order to carry out the process of the invention, the above-specified dyestuffs may be added, for example, to the starting compounds in the condensation for the preparation of the polycondensates, such as polyesters. In the preparation of the dyeings, it is also possible to apply the dyestuffs onto the ready-made and not yet shaped polymers and/or polycondensates, such as polyester materials, for example by powdering or mixing, and subjecting the material thus treated thereafter to a melting process, in order to effect the final mixing and shaping. For the shaping, the polymers and/or polycondensates dyed in this manner, such as polyester materials, may for example be spun into filaments, extruded into sheets or injection-molded into a determined shape from the melt by means of the common equipment.

The dyestuff content of the materials dyed according to the invention depends on the desired color depth. Generally, an amount of dyestuff is used which is in the range of from about 0.05 to 3%, calculated on the weight of the thermoplastic material. With the dyestuffs used, the common methods of dyeing in the mass yield brilliant yellow dyeings of a good color depth which show very good fastness properties with regard to light and rubbing, an excellent fastness to thermosetting and in particular an outstanding heat resistance.

The following Examples serve to illustrate the invention.

EXAMPLE 1

10 Parts by weight of the dyestuff of the formula

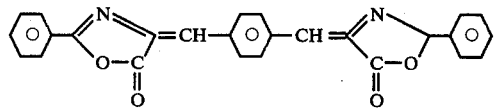

are ground with 90 parts by weight of ethylene-glycol in a bead mill for 30 minutes. 5 Parts by weight of this paste are mixed with 95 parts by weight of bis-(β-hydroxyethyl)terephthalate and condensed in the course of 6 hours in vacuo at a temperature of from 270° to 280° C. The polyester material obtained is granulated and spun into filaments in common manner. Brilliant yellow dyeings are obtained which show a very good fastness to thermosetting and light.

If instead of the above-specified dyestuff there is used, for example, a dyestuff of the formula

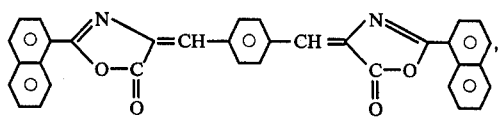

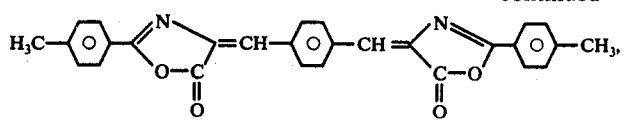

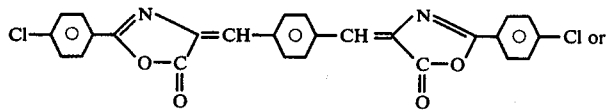

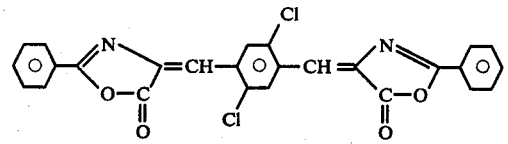

or, for example, a mixture of the dyestuffs of the formulae

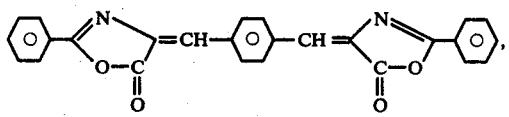

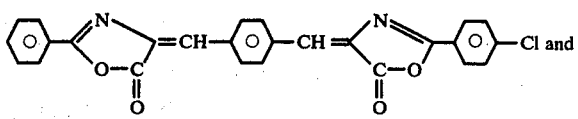

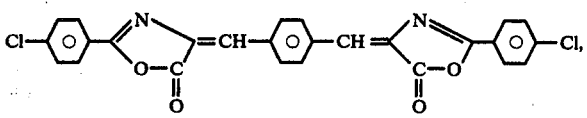

brilliant yellow dyeings are also obtained which show very good fastness properties.

EXAMPLE 2

1 Part by weight of the dyestuff of the formula is mixed with 99 parts by weight of granules of poly-1,4-dimethylol-cyclohexane-terephthalate and spun from the melt. Brilliant yellow-colored filaments are obtained. The dyeings are marked by very good fastness properties with regard to thermosetting and light.

If instead of the above-specified dyestuff there is used, for example, a dyestuff of the formula

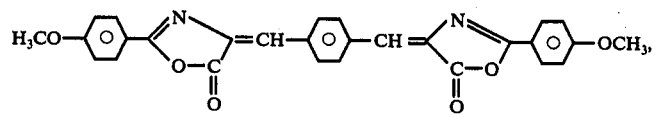

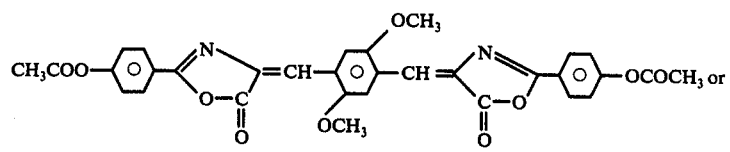

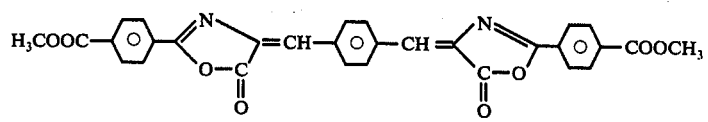

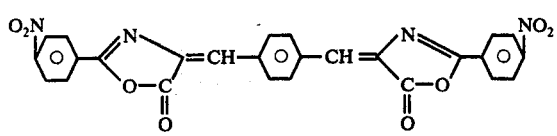

or, for example, a mixture of the dyestuffs of the formulae

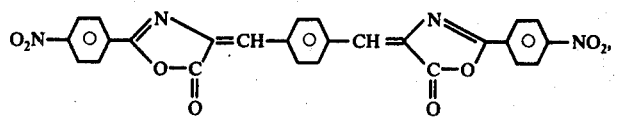

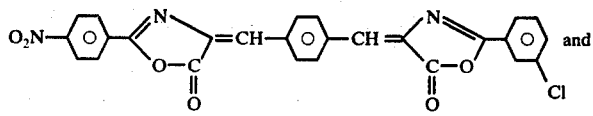

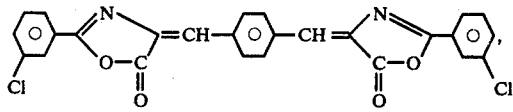

brilliant yellow dyeings are also obtained which show very good fastness properties.

EXAMPLE 3

99 Parts by weight of polyethylene-glycol-terephthalate are dyed according to Example 2 with 1 part by weight of the dyestuff of the formula

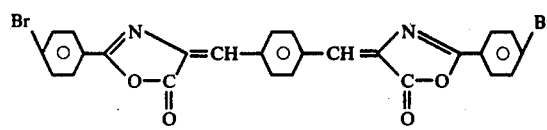

Brilliant yellow dyeings are obtained which show excellent fastness properties.

If instead of the above-specified dyestuff, use is made of dyestuffs of the formulae

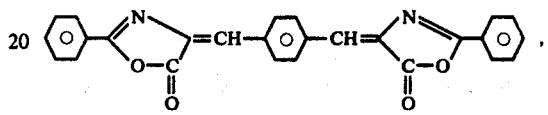

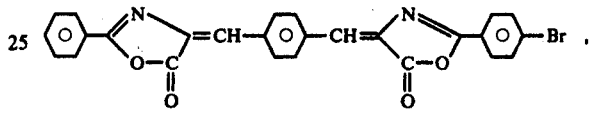

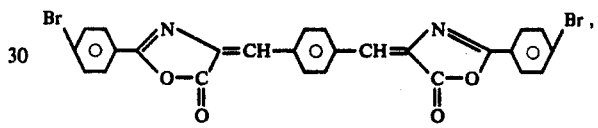

brillant yellow dyeings are also obtained which show

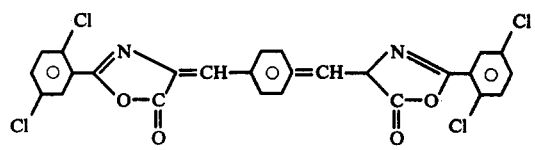

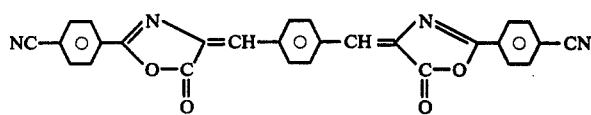

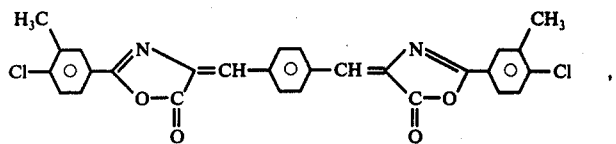

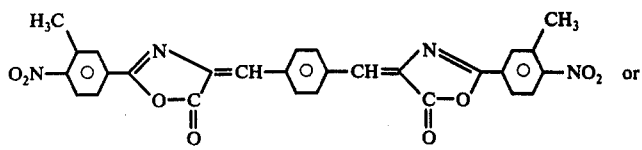

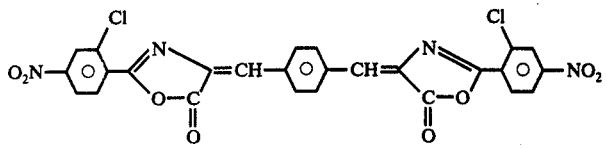

or, for example, a mixture of the dyestuffs of the formulae very good fastness properties.

We claim:

1. Process for the dyeing of a water-insoluble thermoplastic polymer or polycondensate in mass, which comprises adding to the said thermoplastic material before the final molding thereof an azlactone dyestuff of the formula (1)

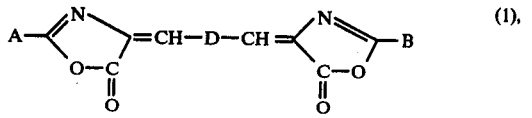

in which A and B each represents naphthyl, phenyl, chlorophenyl, bromophenyl, lower alkyl-phenyl, lower alkoxyphenyl, nitrophenyl,

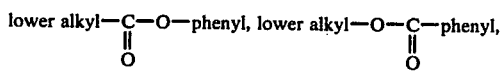

cyanophenyl, dichlorophenyl, chloro-lower alkyl-phenyl, nitro-lower alkyl-phenyl, chloro-nitrophenyl, A and B being identical or different, D represents naphthylene, phenylene, monochlorophenylene, di-chlorophenylene or di-lower alkoxy-phenylene, or with a mixture of dyestuffs of the said formula (1).

2. The process as claimed in claim 1, wherein the dyestuffs of the said formula (1) are added to the starting materials used for the condensation reaction before the condensation.

3. The process as claimed in claim 1, wherein the dyestuffs of the said formula (1) are added to bis(β-hydroxyethyl)terephthalate as starting material for the condensation reaction to yield polyethyleneterephthalate.

4. The process as claimed in claim 1, wherein the dyestuffs of the said formula (1) are applied to a ready-made polymer or polycondensate, which is subsequently subjected to a melting process to attain final mixing and molding.

5. The process as claimed in claim 1, wherein polystyrene, polyamide, polymethacrylate or polyvinylchloride is dyed as a thermoplastic polymer.

6. The process as claimed in claim 1, wherein polyethyleneterephthalate is dyed as a thermoplastic polycondensate.

* * * * *